DIGITAL FILTER AND PULSE WIDTH DISCRIMINATOR

Original Filed Jan. 8, 1969 2 Sheets-Sheet 1

INVENTOR
CHARLES W. RAGSDALE

BY

ATTORNEYS

DIGITAL FILTER AND PULSE WIDTH DISCRIMINATOR

Original Filed Jan. 8, 1969 2 Sheets-Sheet 2

INVENTOR
CHARLES W. RAGSDALE
BY Harry M. Saragovitz, Edward J. Kelly, Herbert Berl, and J. D. Edgerton
ATTORNEYS United States Patent Office 3,555,438
Patented Jan. 12, 1971

3,555,438
DIGITAL FILTER AND PULSE WIDTH DISCRIMINATOR

Charles W. Ragsdale, Takoma Park, Md., assignor to the United States of America as represented by the Secretary of the Army
Original application Jan. 8, 1969, Ser. No. 789,694. Divided and this application Aug. 29, 1969, Ser. No. 854,073
Int. Cl. H03b *1/04*
U.S. Cl. 328—165 10 Claims

ABSTRACT OF THE DISCLOSURE

Disclosed is a digital filter for use in the rate monitoring portion of an electrical heart monitor. The filter comprises a pulse width discriminator coupled to receive the outputs of a pair of Schmitt triggers and includes a first timer for rejecting short duration pulses. The timer output is only activated when signals are received from both triggers. A second and third timer combine to reject subsequent long duration pulses for a predetermined time after an original pulse of intermediate duration.

This application is a division of a co-pending application, Ser. No. 789,694, filed Jan. 8, 1969.

This invention relates to a digital filter and more particularly to a digital filter in the form of a pulse width discriminator for rejecting noise and other undesired wave forms commonly accompanying an electrocardiogram signal. The invention provides a simplified and reliable circuit construction adapted to trigger on the R-wave of an electrocardiogram to determine heart rate while at the same time rejecting noise, power signals, muscle potentials and other electrocardiogram waves such as long-latency T-waves. The filter is particularly constructed for use in the electric heart monitor shown and described in co-pending application S.N. 789,694, filed Jan. 8, 1969.

In the aforementioned co-pending application there is disclosed an electric heart monitor for monitoring electrocardiogram waveforms of a human heart to provide indications of dire cardiac states. The unit is particularly constructed for military use in field hospitals and the like and indicates the kind of cardiac arrest occurring (fibrillation or standstill) since the resuscitative techniques for each type of arrest differ. In addition, the monitor is portable, operates on batteries, and meets military environmental standards by operating over —40° to +130° F. temperature range. It is especially designed for field use and other situations in which oscilloscopes and paper writers are not available, or their use is not feasible.

The heart monitor receives a differential input which is passed through a preamplifier to amplify the electrocardiogram signal which preamplifier contains a bandpass filter having a 3.6 to 76 Hz. (approximately 18 db/octave) bandpass. The signal is then passed through a full wave rectifier to the automatic gain control and to the level detectors feeding a pulse-width discriminator (digital filter) triggered by the level detector pulses. The digital filter discriminates against noise as well as other myocardial signals, such as the T-wave, and supplies an output pulse to a one-shot monostable multivibrator which cannot be retriggered until its timing cycle is complete.

The present invention is directed to a digital filter in the form a pulse-width discriminator for rejecting noise and other undesired signals accompanying an electrocardiogram electrical waveform. The filter comprises a first 10-millisecond timer for rejecting pulses less than 10 milliseconds in widths and includes a second 30-millisecond timer which operates and controls a third 400-millisecond timer for rejecting subsequent pulse widths greater or wider than 30 milliseconds when the original pulse is between 10 and 30 milliseconds. The digital filter is provided with a pair of inputs, one receiving a signal from a 3.0 volt Schmitt trigger, and the other receiving a signal from a 5.0 volt Schmitt trigger. The filter is constructed such that it will not operate even with a 10 to 30-millisecond signal from the 3.0 volt Schmitt trigger, if the output of the 5.0 volt Schmitt trigger is zero. Once a refractory period of 400 milliseconds is established by the third timer, the circuit rejects 3.0 volt Schmitt trigger output pulses that are longer than 30 milliseconds.

It is therefore one object of the present invention to provide an improved digital filter.

Another object of the present invention is to provide an improved digital filter in the form of a pulse-width discriminator.

Another object of the present invention is to provide a digital filter particularly adapted for use in a portable electronic heart monitor.

Another object of the present invention is to provide a digital filter for filtering out undesired wave forms, including long-latency T-waves from an electrocardiogram signal.

These and further objects and advantages of the invention will be more apparent upon reference to the following specification, claims, and appended drawings wherein:

Figure 1:
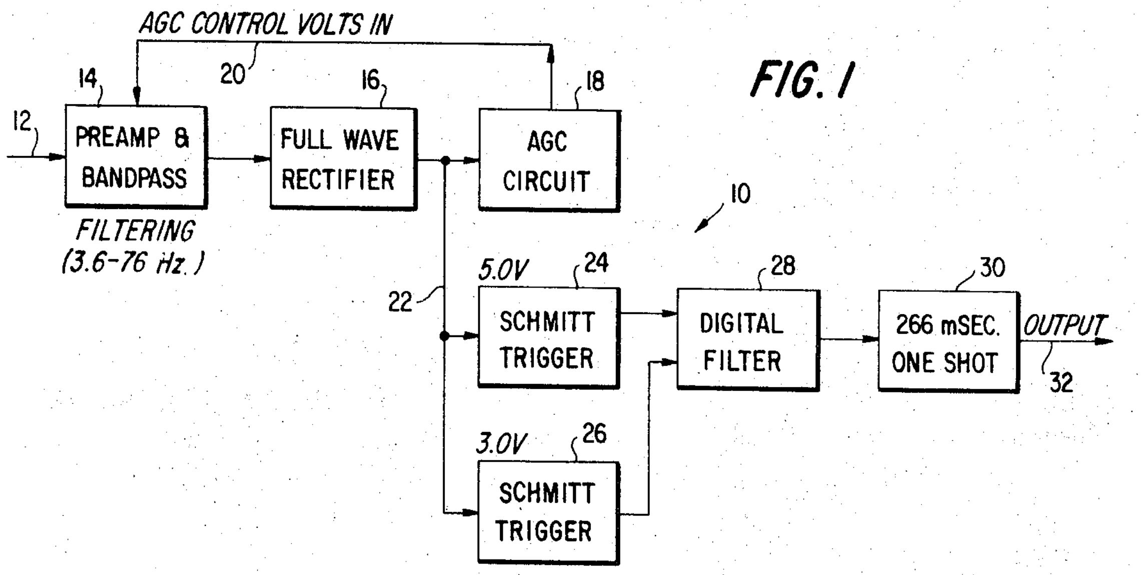
FIG. 1 is a block diagram of a cardiac wave-detecting circuit forming a part of an electric heart monitor including the digital filter of the present invention.

At the beginning of a human heart's pumping cycle, the isometric contraction of the ventricular muscle mass generates a pronounced electrical signal known as the QRS wave complex of the electrocardiogram, commonly called EKG. FIG. 1 is a block diagram of a circuit, generally indicated at 10, incorporated in an electrical heart monitor which is useful in detecting the R wave portion of the QRS complex to give an indication of heart rate. The input electrical signal appearing on lead 12 of the circuit 10 is in the form of an electrocardiogram wave form and is applied to a preamplifier and bandpass filter 14. Preamplifier 14 provides a gain from 1K to 50K adjustable by a control voltage applied to a field effect transistor. It also provides bandpass filtering with ½ power points at 3.6 Hz. and 76 Hz. and approximately 60 db/decade rolloff above and below those points. The output impedance of the preamplifier is 24K.

The preamplifier 14 passes the important frequencies of the EKG (QRS complex, fibrillation) while offering some rejection of high frequency noise (muscle potentials at 100 Hz. or greater, 120 Hz., etc.) and low frequency EKG components (DC electrode voltage, S–T segment shifts, etc.). The output of the preamplifier 14 is applied to a full wave rectifier 16 so that the circuitry following the rectifier output will not be affected by input signal polarity changes.

From the full wave rectifier, the signal is applied to an automatic gain control circuit (AGC) 18 which feeds back a gain control signal by way of lead 20 to preamplifier 14. The AGC circuit 18 originally applies a control voltage to the preamplifier 14 that gives a maximum preamplifier gain. When the full wave rectifier output is greater than the AGC control point (6.0 v.), the AGC output voltage linearly decreases with time to decrease the preamplifier gain, until the rectifier output is below the 6.0 v. level. The maximum gain decrease time is 0.5 second. The AGC output voltage then linearly increases with time (increasing preamplifier gain) until the rectifier output is above the 6.0 v. level again. The maximum gain increase time is 15 seconds.

The AGC output acts with the full wave rectifier 16 to keep the peak preamp signal amplitude at 6.0 v. Because of the capacitive coupling of the full wave rectifier, the AGC and the rectifier act to DC shift the signal and affect its amplitude, giving equal positive and negative peaks at the preamp output, after equilibrium is reached. Because of the slow reaction time of the AGC, only long term amplitude changes are completely adjusted for.

The output of full wave rectifier 16 is suppield by a lead 22 to a 5.0 v. Schmitt trigger 24 and a 3.0 v. Schmitt trigger 26. These in turn feed the two inputs of a digital filter 28. The digital filter is actually a pulse width discriminator and performs the following three functions:

First, the digital filter does not provide an output if the 5.0 v. Schmitt output is 0 or the 3.0 v. Schmitt output pulse width is less than 10 ms. If either of the latter conditions are met, the circuit is also reset. The latter conditions are met with excess muscle potential, 60 Hz. and 120 Hz.

Secondly, the digital filter does provide an output if there is a 5.0 v. Schmitt output along with a 10–30 ms. 3.0 v. Schmitt pulse width. If these conditions exist, for 400 ms. (refractory period) after the 10–30 ms. pulse, 3.0 v. Schmitt pulses greater than 30 ms. are rejected.

Thirdly, digital filter 28 provides an output if there is a 5.0 v. Schmitt output along with a greater than 30 ms. 3.0 v. Schmitt pulse width. No refractory period then exists.

The first condition, or case 1 above, applies when either pure 60 Hz., or 120 Hz., is received (as with an open lead) or when excessive noise is riding on the EKG (such as 60 Hz., 120 Hz., and muscle potentials). These noise artifacts have widths less than 10 ms., while EKG signals have wider widths.

Figure 2:
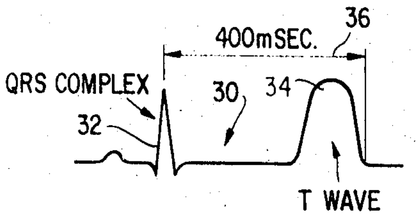
FIG. 2 is a wave-form diagram showing the operation of the digital filter of the present invention.

Condition or case 2 above applies and is useful when a narrow-width QRS complex accompanied with a large amplitude, long-latency T-wave occurs. Such a waveform is illustrated at 30 in FIG. 2. The QRS-complex is indicated at 32, and the long-latency T-wave at 34. The refractory period, or 400-millisecond period is indicated at 36. In the wave form 30, the T-wave 34 is rejected by the digital filter 28.

Figure 3:
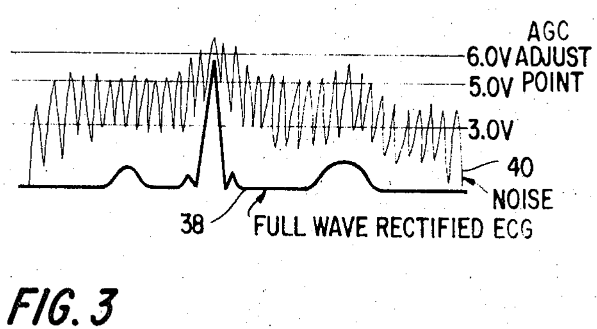
FIG. 3 is a diagram illustrating the operation of the filter under noise conditions.

Condition or case 3 above applies when most other QRS complexes are received. In both cases 2 and 3 a considerable amount of noise is tolerated riding upon the signal. FIG. 3 shows a full-wave rectified ECG at 38 with noise superimposed on it as indicated at 40. In the signal shown in FIG. 3 the noise spikes 40 are rejected when case or condition 1 above is met. Noise riding on the signal itself still allows the meeting of condition 2 or 3 with the proper pulse width. Only when the signal is so completely obscured by noise that the ECG signal peak is driven too far below the 3.0 volt Schmitt threshold does a zero digital filter output exist.

Digital filter 28 feeds a one-shot multivibrator 30. That is, the digital filter triggers the one-shot which emits constant width pulses. In addition, during the one-shot pulse, additional filter outputs will have no effect. Hence, signals (such as the typical T-wave) that are not rejected by the filter are blanked out by the one-shot. The one-shot width is the maximum to still allow a 225-beat per minute maximum rate. The output from the one-shot multivibrator 30 appearing on lead 32, may be applied to a rate-measuring circuit (not shown) for indicating heart rate.

Figure 4:
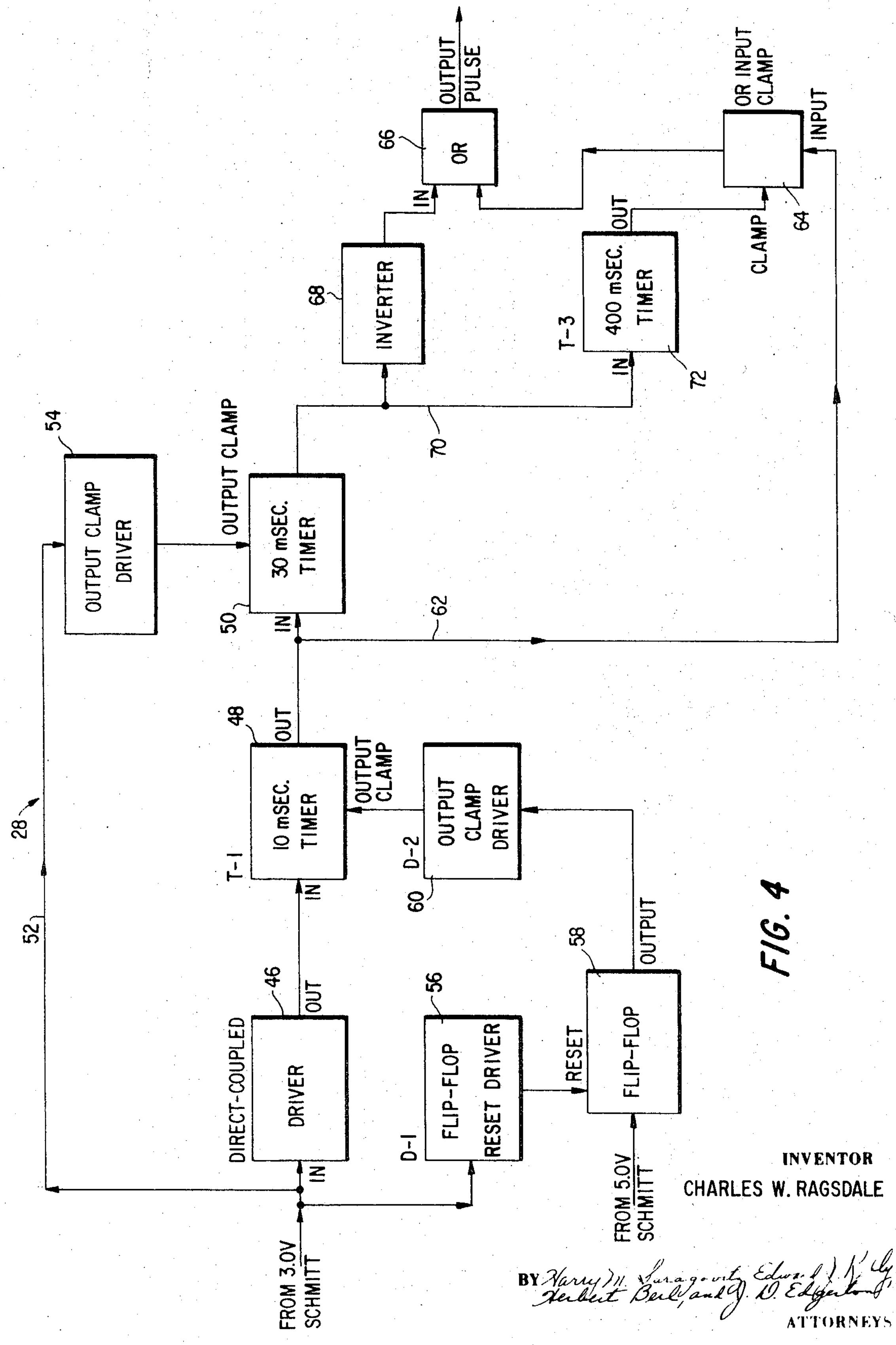
FIG. 4 is a detailed block diagram of the digital filter of FIG. 1.

FIG. 4 is a detailed block diagram of the digital filter 28 of FIG. 1. The input from the 3.0 volt Schmitt is supplied to a direct coupled driver 46 which feeds a 10-millisecond timer at 48. The output of the 10-millisecond timer is in turn coupled to a 30-millisecond timer at 50.

The input from the 3.0-volt Schmitt is also fed by way of lead 52 through an output clamp driver 54 to the 30-millsecond timer 50. In addition, the input signal is supplied to a flip-flop reset driver 56 supplying a reset signal to a flip-flop 58 having its input connected to receive a signal from the 5.0-volt Schmitt. The output of the flip-flop is supplied to the 10-millisecond timer 48 by way of an output clamp driver 60. The input of 30-millisecond timer 50 is connected by way of lead 62 to OR input clamp 64 feeding one input of an OR gate 66. The other input of the OR gate is connected to the output of 30-millisecond timer 50 by way of an inverter 68. 30-millisecond timer 50 also feeds a signal by way of lead 70 to a 400-millisecond timer 72 having its output connected to OR input clamp 64.

In operation of the digital filter 28, when the 3.0-volt Schmitt is triggered, flip-flop 58 is released (but not triggered) by flip-flop reset driver 56. Concurrently the 10-millisecond timer 48 is released and timing is begun. If, while the 3.0-volt Schmitt is triggered, the 5.0-volt Schmitt is also triggered, the flip-flop changes state, releasing the clamp through driver 60 on the output of 10-millisecond timer 48. If the 3.0-volt Schmitt trigger remains triggered for more than 10 milliseconds, at the end of the 10-millisecond time a positive pulse appears at the output of timer 48. However, if the 3.0-volt Schmitt resets before the 10 millisecond time is reached, the timer and the flip-flop are reset. No pulse then appears at the output of timer 48.

When a pulse appears at the timer output, the 30-millisecond timer 50 begins to run. Also, timer 48 acts through OR input clamp 64 and the OR gate 66 to provide a digital filter output pulse. The triggered 3.0-volt Schmitt acts through driver 54 to clamp the output of timer 50. However, when timer 50 is triggered, a pulse would be seen at the output of this timer if the clamp were removed (which occurs when the 3.0 volts is no longer triggered). Hence, if the 3.0-volt Schmitt is less than 30 milliseconds, timer 50 has an output. The output of this timer triggers the 400-millisecond timer 72 which enables the OR input clamp for 400 milliseconds. As a result, only an output from timer 50 can then affect the OR gate output, for a 400-millisecond interval. Schmitt pulses less than 30 milliseconds in width can occur at intervals less than 400 milliseconds and produce a filtered output through timer 50. If Schmitt pulse widths are greater than 30 milliseconds, after 400 milliseconds timer 72 resets, the output of 10-millisecond timer 48 affects the OR gate output directly.

It is apparent from the above that the present invention provides an improved filtering device for separating undesired signals from an electrocardiogram wave form so as to make it more possible to readily determine the rate of a heartbeat. Important features of the invention include a digital filter in the form of a pulse width discriminator incorporating a plurality of timers for eliminating signals of less than about 10 milliseconds in duration and in particularly eliminating long-latency T-waves which may accompany the electrocardiogram waveform. The filter permits a substantial amount of noise to ride on the signal without affecting its output if the pulse width requirements of the filter are met.

What is claimed and desired to be secured by United States Letters Patent is:

1. A digital filter comprising a first timing means for rejecting pulses of less than a first duration but passing pulses of greater than said first duration, and second timing means coupled to said first timing means for rejecting for a predetermined time all subsequent pulses longer than a second greater duration when the original pulse is of less than said second duration.

2. A digital filter according to claim 1 wherein said first timing means includes means for rejecting pulses of less than about 10 milliseconds, said second timing means including means for rejecting for a period of about 400 milliseconds all subsequent pulses longer than about 30 milliseconds when the original pulse is between 10 and 30 milliseconds.

3. A digital filter according to claim 1 wherein said first timing means includes a first timer, said second timing means including a second timer coupled to the output of said first timer and a third timer coupled to the output of said second timer.

4. A digital filter according to claim 3 wherein the timing cycle of said second timer is greater than the timing cycle of said first timer and less than the timing cycle of said third timer.

5. A digital filter according to claim 4 including a filter output, means coupling said first timing means to said output, means coupling said second timing means to said output, and means responsive to an output signal from said second timing means for uncoupling said first timing means from said output.

6. A digital filter according to claim 5 wherein said uncoupling means comprises said third timer and a signal clamp.

7. A digital filter according to claim 6 wherein said first and second timers are coupled to said output through an OR gate, said first timer being coupled to said OR gate through an OR input clamp, said third timer coupling the output of said second timer to said OR input clamp.

8. A digital filter according to claim 3 including a pair of filter inputs, a first Schmitt trigger having a lower firing potential coupled to one of said inputs, a second Schmitt trigger having a higher firing potential coupled to the other of said inputs, and means coupling said inputs to said first timer whereby said first timer is only activated to produce an output in response to a signal from both of said Schmitt triggers.

9. A digital filter according to claim 8 wherein said first Schmitt trigger is about a three-volt trigger and said second Schmitt trigger is about a five-volt Schmitt trigger.

10. A digital filter according to claim 8 including a flip-flop coupling said second Schmitt trigger to said first timer, flip-flop reset means coupling the output of said first Schmitt trigger to said flip-flop, and clamping means coupling the output of said first Schmitt trigger to said second timer.

References Cited

UNITED STATES PATENTS

| | | | |
|---|---|---|---|
| 3,126,449 | 3/1964 | Shirman | 328—165X |
| 3,383,605 | 5/1968 | Davidoff | 328—138 |
| 3,413,412 | 11/1968 | Townsend | 328—112X |

STANLEY T. KRAWCZEWICZ, Primary Examiner

U.S. Cl. X.R.

307—233, 234, 295; 325—65; 328—112, 138